(No Model.)
J. C. McAFEE
NUT LOCK.
No. 303,653. Patented Aug. 19, 1884.
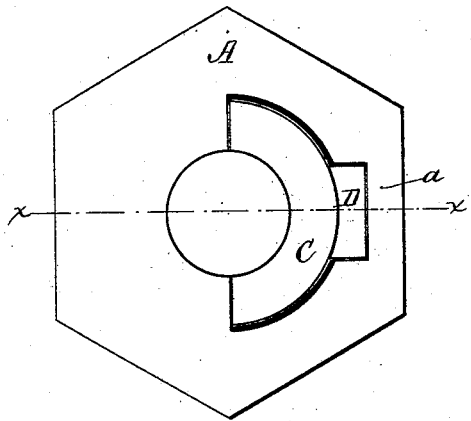
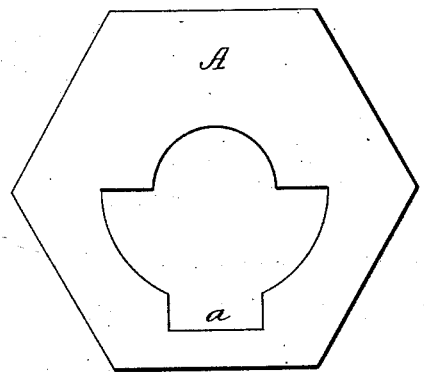
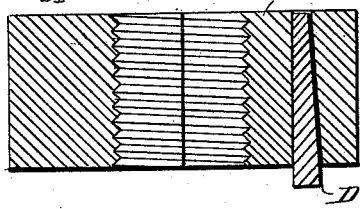
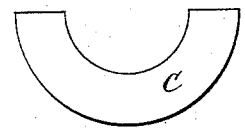
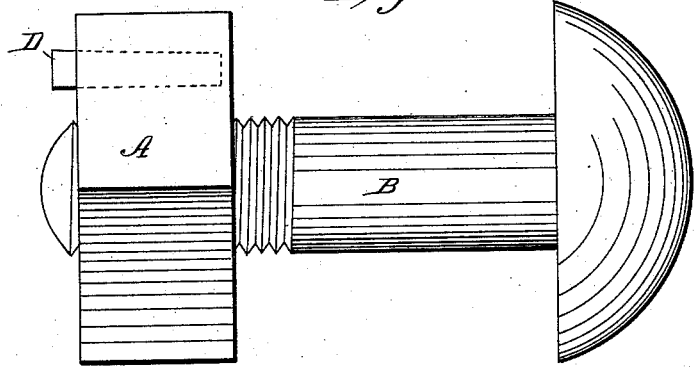
WITNESSES:
W. W. Hollingsworth
Edw. W. Byrn
INVENTOR:
J. C. McAfee
BY Munn
ATTORNEYS.

UNITED STATES PATENT OFFICE.

JACOB C. McAFEE, OF DALLAS, WEST VIRGINIA.

NUT-LOCK.

SPECIFICATION forming part of Letters Patent No. 303,653, dated August 19, 1884.

Application filed December 31, 1883. (No model.)

*To all whom it may concern:*

Be it known that I, JACOB C. McAFEE, a citizen of the United States, residing at Dallas, in the county of Marshall and State of West Virginia, have invented certain new and useful Improvements in Nut-Locks, of which the following is a description.

Figure 1 is a face view of the nut. Fig. 2 is a section of the same through the line x x. Fig. 3 is a face view of the nut with the block C and key D removed. Fig. 4 is a detail of said block. Fig. 5 is a side view of the nut applied to a bolt.

My invention relates to that form of nut-lock in which the nut has a threaded block fitted within the nut, and adapted to be forced against the threads of the bolt to bind thereagainst and lock the nut on the bolt; and it consists in making the recess for the threaded block entirely through the nut, and the threaded block of the same thickness as the nut, and combining with it a wedge which is driven in behind the block, as hereinafter fully described.

In the drawings, A represents the nut, which may be hexagonal, square, or other shape, and B is the bolt. Upon one side of the inner periphery of the bolt-hole the nut is recessed or cut away the full thickness of the nut, and in this recess is fitted a block, C, of the same thickness as the nut, and of a shape corresponding to the shape of the recess. This block has a curved surface upon the side next to the bolt, which curved surface represents just half of the circle of the bolt-hole, and said curved surface has cut upon it a thread of the same pitch as the rest of the nut. In the nut behind this block, or in the block, or partly in both, is formed a key-seat, *a*, into which is driven a key or wedge, D, which in entering in direction parallel to the bolt forces the threaded block into a firmly-binding contact with the threads on that side of the bolt, which prevents the nut from ever turning off until the key is removed and the block loosened.

I am aware that a nut has had a threaded block which was seated in a recess in the face of the nut and advanced to binding contact with the bolt by a small supplemental screw; but this nut and recess represented only a part of the thickness of the nut, and said block does not give so good a bearing in locking, and is rendered expensive by the supplemental screw. The screw also projects in a direction to make it obtrusive. The recess which is of less depth than the thickness of the nut is troublesome to make, and cannot be punched, as can my recess, which passes all the way through. In loosening or unlocking the nut also the removal of the thin block does not loosen the nut, particularly when it is rusted, while with my construction the loosening of the block allows the nut to fall away from the bolt, and the wedge is not only less obtrusive, but is less expensive, and exerts a better holding power. Again, if the bolt and nut are not exactly fitted in the tapping process, the nut and block in my device will adapt themselves to the bolt, which is not true of a construction in which the block is of less thickness than the nut and is seated in a recess on one side.

Having thus described my invention, what I claim as new is—

1. A nut having an aperture entirely through the same, one side of which is cut to the circumferential curve of the bolt, and the other side made larger to receive a locking-block, in combination with the locking-block of equal thickness to the nut, having its inner surface cut to the circumferential curve of the bolt, and screw-threaded, and the key or wedge fitted between the block and the outer portion of the nut, as and for the purpose set forth.

2. A nut having an aperture entirely through the same, one side of which is cut to correspond to the semi-circumference of the bolt, and threaded, and the other side of which is made larger to receive a locking-block, in combination with the locking-block C, of equal thickness to the nut, having its inner surface cut to correspond to the semi-circumference of the bolt, and threaded, and a key or wedge fitted behind the block, and between the same and the outer portion of the nut, as and for the purpose set forth.

JACOB C. McAFEE.

Witnesses:
 H. B. McNEILL,
 GEO. L. TAYLOR.